US008303806B2

(12) United States Patent
Mohseni et al.

(10) Patent No.: US 8,303,806 B2
(45) Date of Patent: Nov. 6, 2012

(54) FLUID PROCESSING

(75) Inventors: Saeed H. Mohseni, Sylvania, OH (US);
Deepak Mahulikar, Madison, CT (US)

(73) Assignee: Planar Solutions, LLC, Adrian, MI (US)

( * ) Notice: Subject to any disclaimer, the term of this patent is extended or adjusted under 35 U.S.C. 154(b) by 158 days.

(21) Appl. No.: 12/702,602

(22) Filed: Feb. 9, 2010

(65) Prior Publication Data
US 2010/0320127 A1 Dec. 23, 2010

Related U.S. Application Data

(60) Provisional application No. 61/151,053, filed on Feb. 9, 2009.

(51) Int. Cl.
*B01D 35/157* (2006.01)
*B01D 29/50* (2006.01)
*B01D 35/00* (2006.01)

(52) U.S. Cl. ....... 210/85; 210/258; 210/323.1; 210/241; 210/97; 210/134; 210/135; 210/245

(58) Field of Classification Search .............. 210/85, 210/258, 323.1, 241, 97, 134, 135, 142, 214, 210/215, 245, 343, 424, 456
See application file for complete search history.

(56) References Cited

U.S. PATENT DOCUMENTS

| | | | | | |
|---|---|---|---|---|---|
| 3,650,283 | A | * | 3/1972 | Lang | 134/143 |
| 4,108,775 | A | | 8/1978 | Wilkes et al. | |
| 4,859,324 | A | | 8/1989 | Levy et al. | |
| 5,073,260 | A | * | 12/1991 | Wilkendorf | 210/238 |
| 5,670,038 | A | * | 9/1997 | McKinney | 210/98 |
| 5,928,492 | A | | 7/1999 | Corlett et al. | |
| 5,951,725 | A | * | 9/1999 | Vross et al. | 55/356 |
| 6,077,437 | A | | 6/2000 | Hayashi et al. | |
| 7,186,337 | B2 | * | 3/2007 | Reid | 210/232 |
| 7,410,581 | B2 | * | 8/2008 | Arnold et al. | 210/321.85 |
| 2002/0003112 | A1 | | 1/2002 | Golden | |
| 2002/0121465 | A1 | | 9/2002 | Gannon | |
| 2002/0168926 | A1 | | 11/2002 | Matsumoto et al. | |

(Continued)

FOREIGN PATENT DOCUMENTS
GB 1026803 4/1966
(Continued)

OTHER PUBLICATIONS

Baharlou, Simin, "Notification Concerning Transmittal of International Preliminary Report on Patentability (Chapter I of the Patent Cooperation Treaty)", International Application No. PCT/US2010/023567, issued on Aug. 18, 2011 (7 pages).

(Continued)

*Primary Examiner* — Nam Nguyen
*Assistant Examiner* — Madeline Gonzalez
(74) *Attorney, Agent, or Firm* — Fish & Richardson P.C.

(57) ABSTRACT

Fluid processing apparatuses and systems are disclosed. In some embodiments the fluid processing apparatuses include a movable enclosure, a plurality of filter housings disposed substantially within the movable enclosure, and a stand disposed within the enclosure. The filter housings are in fluid communication with one another. Each filter housing defines an elongate path and is configured to support a respective filter along the elongate flow path to filter a substantially continuous flow of fluid. The stand supports each filter housing such that the elongate flow path of each filter housing is substantially parallel to a vertical axis, wherein each filter housing is independently rotatable, relative to the stand.

20 Claims, 6 Drawing Sheets

U.S. PATENT DOCUMENTS

| | | |
|---|---|---|
| 2004/0069878 A1 | 4/2004 | Osuda et al. |
| 2004/0173531 A1 | 9/2004 | Hammond |
| 2005/0218059 A1 | 10/2005 | Knoll |
| 2007/0163943 A1 | 7/2007 | Collins et al. |
| 2007/0221575 A1 | 9/2007 | Copeland et al. |
| 2007/0251876 A1* | 11/2007 | Krogue et al. ............. 210/323.2 |

FOREIGN PATENT DOCUMENTS

| | | |
|---|---|---|
| JP | 62-83086 | 4/1987 |
| JP | 11-28338 | 2/1999 |
| JP | 11-137980 | 5/1999 |
| JP | 2000-70938 | 3/2000 |
| JP | 2001-225070 | 8/2001 |
| JP | 2003-300072 | 10/2003 |

OTHER PUBLICATIONS

ChemFlow Systems, Inc., "Adjustable U-Tube Technology", http://www.chemflowsys.com/Technology/Utube.htm (2010) (1 page).

Filter Concept Inc., "Process Filtration", http://www.filterexporter.com/process-filtration.html (2010) (3 pages).

Hughes, "CMPlicity™: Displacing Cost and Complexity with Efficiency and Simplicity in CMP", *ATMI*, NCCAVS CMPUG Meeting, Semicon West 2008 (25 pages).

Young, W. Lee, "Notification of Transmittal of the International Search Report and the Written Opinion of the International Searching Authority , or the Declaration," International Appl. No. PCT/US10/23567, issued Apr. 2, 2010 (12 pages).

Gonzalez, Madeline, "Office Action", U.S. Appl. No. 12/850,915, issued on May 4, 2012 (13 pages).

\* cited by examiner

FLUID PROCESSING

CLAIM OF PRIORITY

This U.S. patent application claims priority under 35 U.S.C. §119(e) to U.S. Provisional Application 61/151,053, filed on Feb. 9, 2009, the disclosure of which is considered part of the disclosure of this application and is hereby incorporated by reference in its entirety.

TECHNICAL FIELD

This disclosure relates to fluid processing systems and related components and methods.

BACKGROUND

Mixing is a process in which two or more substances are combined while the chemical properties of each substance remain unchanged. The properties of the overall mixture, however, can differ from those of the component substances. Thus, mixing is often used to produce a medium with a desired set of physical and chemical properties.

For example, in semiconductor fabrication, chemical mechanical planarization (CMP) is used to make wafer surfaces flat. This process requires slurry of abrasive particles dispersed in a chemically corrosive agent. During CMP, movement of the abrasive particles on the wafer mechanically removes material from the wafer surface. The chemically corrosive agent of the slurry facilitates this mechanical removal of material by reacting with the material to be removed. To produce CMP slurry having desired properties, it can be useful to filter the CMP slurry to achieve the desired distribution of abrasive particles dispersed within the chemically corrosive agent.

SUMMARY

In one aspect of the invention, a fluid filtration apparatus includes a movable enclosure and a first plurality of filter housings disposed substantially within the movable enclosure. The first plurality of filter housings are in fluid communication with one another, and each filter housing is configured to support a filter therein to filter a substantially continuous flow of fluid.

In another aspect of the invention, a fluid filtration system includes a material feed, a flow controller, a pump, and a fluid filtration apparatus. The flow controller is in fluid communication with the material feed and a processing stream. The pump is in fluid communication with the material feed and the flow controller and is configured to move material from the material feed to the flow controller. The fluid filtration apparatus is in fluid communication with the pump. The fluid filtration apparatus includes a movable enclosure, a first plurality of filter housings, and a first plurality of filters. The first plurality of filter housings is disposed substantially within the movable enclosure and each filter housing of the first plurality of filter housings is in fluid communication with one another. Each filter of the first plurality of filters is supported in a respective filter housing to filter a substantially continuous flow of fluid.

Embodiments can include one or more of the following features.

In some embodiments, each filter housing is configured to be releasably detachable from the respective filter supported therein.

In certain embodiments, the filter housings are in fluid communication in series with one another to receive a substantially continuous flow of fluid. In some embodiments, the first plurality of filter housings is configured to support filters having different pore sizes. In certain embodiments, the plurality of filter housings are configured to support filters having progressively smaller pore sizes in the direction of the substantially continuous flow of fluid.

In some embodiments, each filter housing is configured to support a filter cartridge. In certain embodiments, each filter housing is configured to support an open-end cartridge.

In certain embodiments, the plurality of filter housings are arranged in parallel with one another such that each filter housing receives at least a portion of a substantially continuous flow of fluid. In some embodiments, the plurality of filter housings are configured to support filters having substantially the same pore sizes.

In some embodiments, the movable enclosure includes a plurality of wheels for moving the fluid filtration apparatus, the plurality of filter housings disposed substantially within the movable enclosure, above the plurality of wheels. In certain embodiments, at least one of the plurality of wheels is lockable in place.

In certain embodiments, the movable enclosure comprises at least one panel removable to provide access to at least one filter housing.

In some embodiments, the movable enclosure includes at least one door configured to provide access to at least one filter housing. In certain embodiments, the movable enclosure defines a substantially cuboid volume and the movable enclosure includes a door on more than one side (e.g., each side) of the cuboid.

In certain embodiments, the fluid filtration apparatus includes an inlet conduit passing through the movable enclosure for fluid communication with the first plurality of filter housings. In some embodiments, the fluid filtration apparatus includes a quick disconnect coupling disposed on the inlet conduit to establish fluid communication between the inlet conduit and a supply of a substantially continuous flow of fluid.

In some embodiments, the fluid filtration apparatus includes an outlet conduit passing through the movable enclosure for fluid communication with the first plurality of filter housings. In certain embodiments, the fluid filtration apparatus includes a quick disconnect coupling disposed on the outlet conduit to establish fluid communication between the outlet conduit and a processing stream for receiving a substantially continuous flow of fluid.

In certain embodiments, at least a portion of the movable enclosure is transparent. In some embodiments, at least a portion of the movable enclosure is poly(methyl methacrylate).

In some embodiments, the movable enclosure is dimensioned to fit within a size envelope with a height of about 50 inches, a width of about 40 inches, and a length of about 40 inches.

In certain embodiments, the fluid filtration apparatus includes a flexible tube extending between each of the filter housings to establish fluid communication between each of the filter housings.

In some embodiments, the fluid filtration apparatus includes a plurality of quick disconnect couplings disposed on each respective filter housing for connecting the filter housing to the respective filter tube.

In certain embodiments, each filter housing has an inlet portion and an outlet portion, each filter housing defines an elongate path between the inlet portion and the outlet portion, and each filter housing is configured to support the respective filter along the elongate flow path. In some embodiments, each filter housing is configured to receive a filter through at least one of the inlet portion and the outlet portion. In some embodiments, the fluid filtration apparatus, includes a stand disposed within the enclosure, the stand supporting each filter housing such that the elongate flow path of each housing is substantially parallel to a vertical axis. In certain embodiments, each filter housing is independently rotatable relative to the stand about a horizontal axis. In some embodiments, each filter housing is independently rotatable relative to the stand about a horizontal axis to form about a 45 degree angle between the elongate flow path of the respective filter housing and the vertical axis. In certain embodiments, the fluid filtration apparatus includes a plurality of sensors, each sensor disposed on a respective filter housing and in fluid communication with each respective filter housing. Each sensor extends away from the stand at an angle with respect to the respective elongate flow path. In some embodiments, the stand is rotatable about a vertical axis to move the first plurality of filter housings relative to the movable enclosure. In certain embodiments, the stand is lockable in place relative to the movable enclosure.

In some embodiments, each filter housing is polyvinyl chloride.

In certain embodiments, each filter housing is stainless steel.

In some embodiments, each filter housing defines a substantially cylindrical volume. In certain embodiments, the substantially cylindrical volume has an inner diameter of greater than about 2.5 inches and less than about 18 inches. In some embodiments, the substantially cylindrical volume has a length of greater than about 1 inch and less than about 50 inches.

In certain embodiments, each filter housing is configured to support a single open end filter cartridge.

In some embodiments, each filter housing is configured to support a double open end filter cartridge.

In certain embodiments, each filter housing is configured to support an O-ring type filter.

In some embodiments, the fluid filtration apparatus includes a second plurality of filter housings and a valve switch in fluid communication with each of the first plurality of filter housings and the second plurality of filter housings. The valve switch is configured to direct a substantially continuous flow of fluid between the first plurality of filter housings and the second plurality of filter housings.

In certain embodiments, the valve switch is a two-way valve.

In some embodiments, the fluid filtration apparatus includes a first plurality of sensors and a second plurality of sensors. The first plurality of sensors are each configured to measure a fluid parameter and each in fluid communication with a volume defined by a respective filter housing of the first plurality of filter housings. The second plurality of sensors are each configured to measure a fluid parameter and each in fluid communication with a volume defined by a respective filter housing of the second plurality of housings.

In some embodiments, the fluid filtration apparatus further includes a controller in electrical communication with the first and second plurality of sensors. The controller is configured to receive a measured fluid parameter from the sensors, and activate the valve switch based on a comparison between the measured fluid parameter and a threshold value. The activation of the valve switch redirects the substantially continuous flow from the first plurality of filter housings to the second plurality of filter housings. In certain embodiments, the controller is further configured to send an alarm signal to indicate the need for maintenance of the first plurality of filter housings. In some embodiments, the controller is further configured to indicate which filter housing of the first plurality of filter housings requires maintenance. In certain embodiments, the controller is further configured to compare the valve switch position to signals received from the plurality of sensors to determine an alarm condition. In some embodiments, each sensor is configured to measure pressure of fluid in the respective first and second plurality of filter housings. In certain embodiments, the controller is configured to determine the pressure drop across each filter supported in the respective filter housing. In some embodiments, each sensor is configured to measure large particle count of fluid in the respective first and second plurality of filter housings. In some embodiments, each sensor is configured to measure conductivity of fluid in the respective first and second plurality of filter housings. In certain embodiments, each sensor is configured to measure pH level of fluid in the respective first and second plurality of filter housings.

In certain embodiments, the fluid filtration apparatus further includes a plurality of filters, each filter supported in a respective filter housing to filter a substantially continuous flow of fluid. In some embodiments, each filter housing is configured to be releasably detachable from the respective filter supported therein.

In some embodiments, the first plurality of filter housings support filters having progressively smaller pore sizes in the direction of the substantially continuous flow of fluid. In certain embodiments, each filter has a pore size of greater than about 0.05 microns and less than about 200 microns. In some embodiments, each filter has a pore size of greater than about 0.1 microns and less than about 10 microns. In certain embodiments, each filter has a pore size of greater than about 0.2 microns and less than about 1 micron.

In some embodiments, the pump includes a diaphragm pump. In certain embodiments, the diaphragm pump is a bladder pump. In some embodiments, the diaphragm pump is an electro-mechanical diaphragm pump.

In certain embodiments, the flow controller is an adjustable orifice.

In some embodiments, the flow controller is a U-tube flow controller.

In certain embodiments, the fluid filtration system includes a plurality of flow controllers. Each flow controller is individually adjustable to achieve a target flow rate of the substantially continuous flow of fluid.

In some embodiments, the fluid filtration system further includes an in-line mixer in fluid communication with the pump and the fluid filtration apparatus. The in-line mixer is disposed between the pump and the fluid filtration apparatus.

Other aspects, features, and advantages will be apparent from the description and drawings, and from the claims.

DETAILED DESCRIPTION

Figure 1:
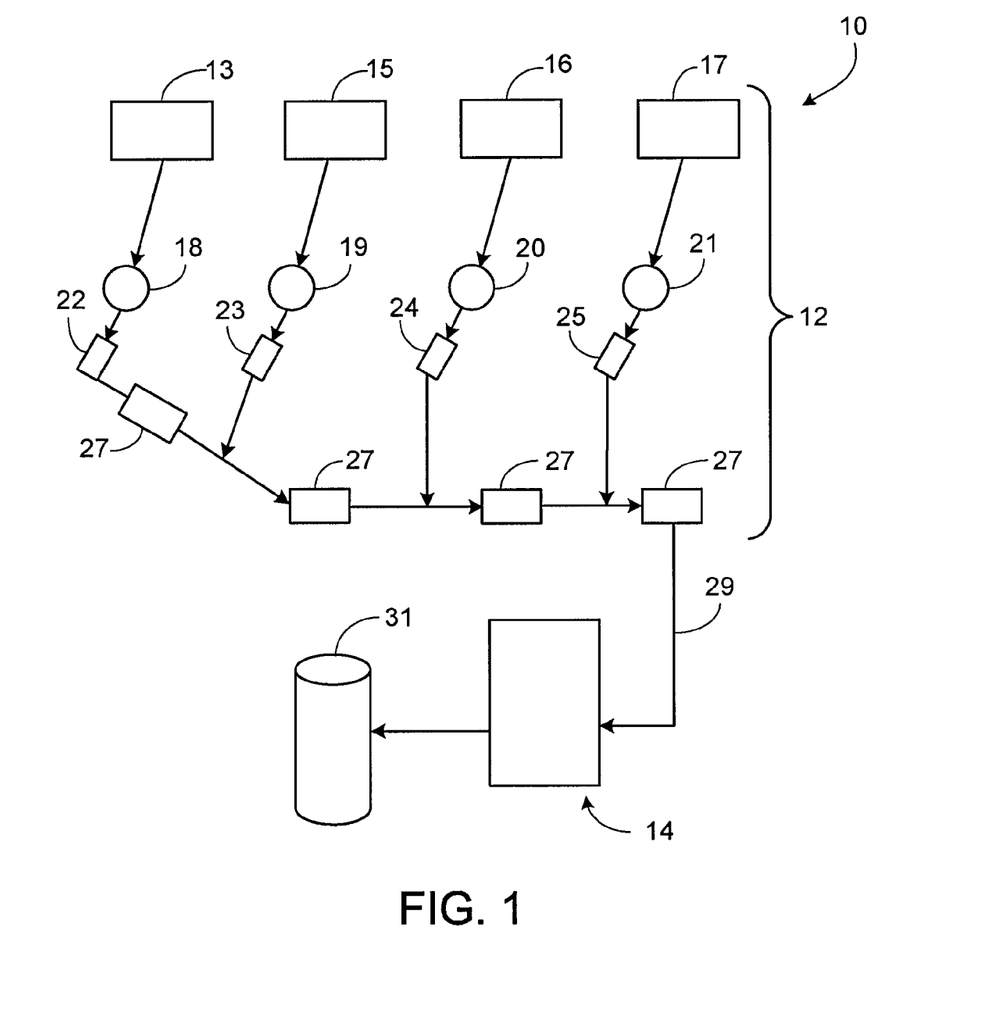
FIG. 1 is a schematic view of a slurry blending plant with a filter station disposed between a product packaging station and a series of in-line mixers.
Figure 2:
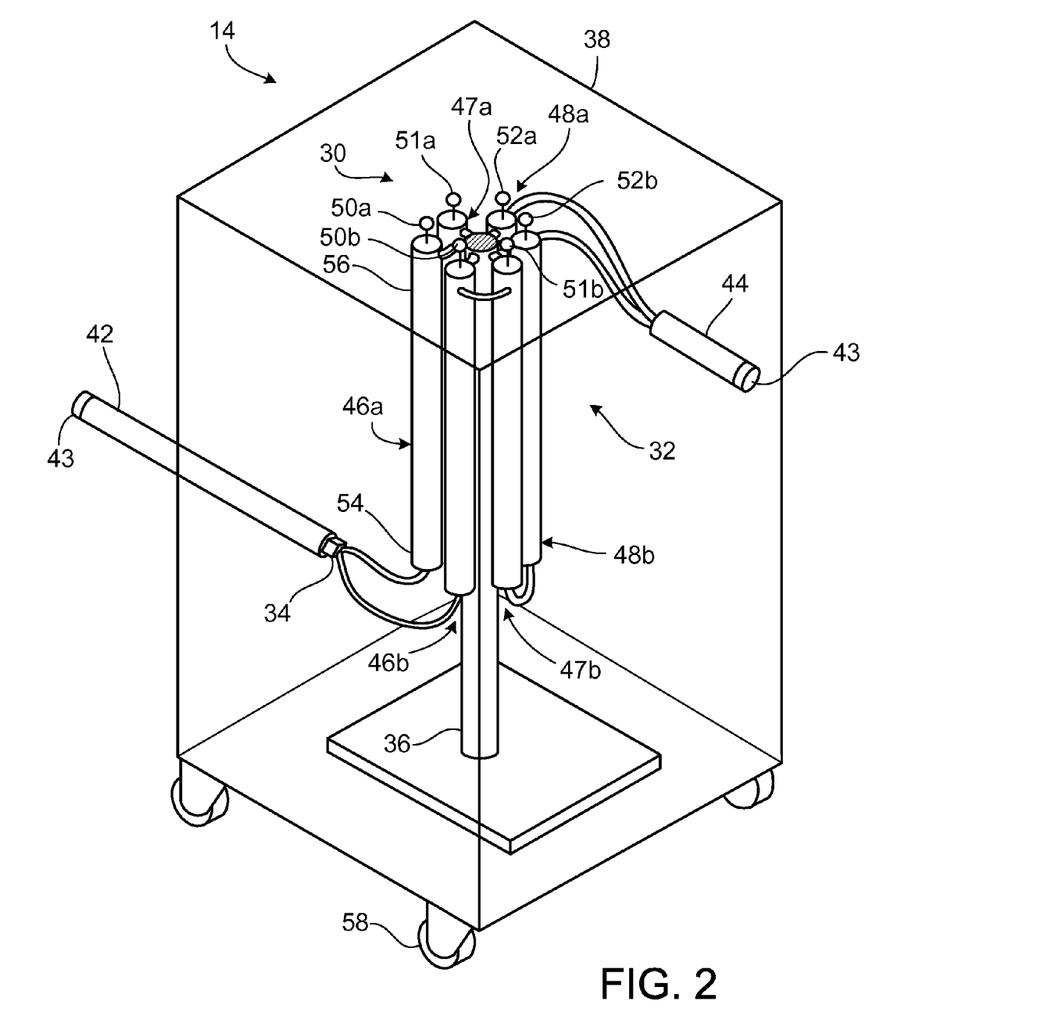
FIG. 2 is a schematic view of the filter station of FIG. 1.
Figure 3:
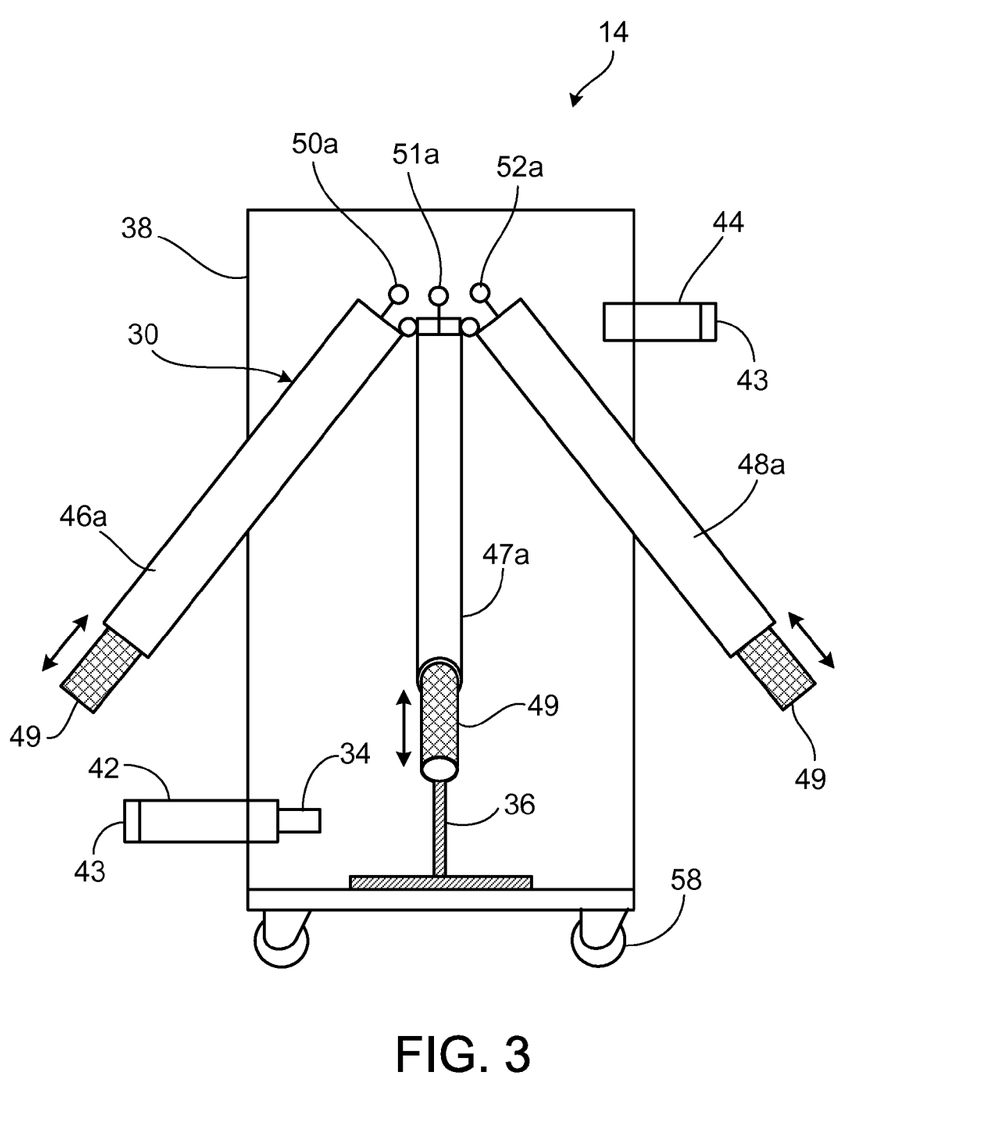
FIG. 3 is a schematic of a filter housing of the filter station of FIG. 1 tilting about a horizontal axis during filter replacement.

Referring to FIGS. 1-3, a continuous slurry blending plant 10 includes a mixing station 12, a filter station 14, and a product packaging station 16. The filter station 14 is positioned along a processing stream 29, between the mixing station 12 and the product packaging station 16. As described below, the filter station 14 includes a first filter set 30, a second filter set 32, and a valve switch 34 in fluid communication with the first and second filter sets 30, 32 to direct a continuous flow of slurry to either the first filter set 30 or the second filter set 32.

During use, the mixing station 12 mixes raw materials to form a substantially continuous flow of slurry that moves toward the filter station 14, along the processing stream 29. At the filter station 14, cartridge filters 49 positioned in the first and second filter sets 30, 32 remove agglomerated particles and/or impurities from the slurry. The filtered slurry then flows to the product packaging station 16 where, for example, the slurry can be used in CMP of wafers or packaged for use at another location. As described below, the blending plant 10 controls the position of the valve switch 34 such that maintenance (e.g., filter changes) can be performed on one filter set (e.g., the first filter set 30) while slurry continues to flow through the other filter set (e.g., the second filter set 32). The on-line maintenance facilitated by filter station 14 can reduce the amount of operational downtime required for maintenance. The on-line maintenance facilitated by the filter station 14 can also improve the yield of wafer production, for example, by reducing the likelihood that agglomerated particles will reach and interfere with downstream processes performed at the product packaging station 16.

The substantially continuous processing carried out by the blending plant 10 can have a higher volume throughput and/or require less space than a plant relying on batch processing. Additionally or alternatively, by reducing start and stop operation characteristic of batch processing, the blending plant 10 reduces slurry shearing and, thus, reduces the likelihood of particle agglomeration resulting from such shearing. As also described below, the filter station 14 is movable to facilitate assembly and/or reconfiguration of the blending plant 10.

The mixing station 12 includes material feeds 13, 15, 16, 17, pumps 18, 19, 20, 21, flow controllers 22, 23, 24, 25, and mixers 27. Each pump 18, 19, 20, 21 is disposed between a respective material feed 13, 15, 16, 17 and a respective flow controller 22, 23, 24, 25. The mixers 27 are in-line pipe mixers positioned in series along the processing stream 29, and each mixer 27 includes baffles for inducing swirl (e.g., dual swirl) into the flow of materials introduced into the processing stream 29 through the flow controllers 22, 23, 24, 25. Each mixer 27 is positioned downstream of a corresponding flow controller 22, 23, 24, 25 such that there is a respective mixer 27 downstream of each material feed 13, 15, 16, and 17.

Material feeds 13, 15, 16, 17 each provide an inlet for receiving raw material to be combined into slurry. Material feed 13 receives the chemically corrosive agent that acts as the dispersion medium of the slurry. Slurry components, such as abrasive particles, are introduced downstream, through material feeds 15, 16, 17. A single raw material can be introduced through more than one of the material feeds 13, 15, 16, 17 to stratify the raw material along the processing stream 29 which can, for example, improve mixing quality.

Each pump 18, 19, 20, 21 moves a raw material from a respective material feed 13, 15, 16, 17 through a respective flow controller 22, 23, 24, 25. Pumps 18, 19, 20, 21 can be electro-mechanical diaphragm pumps including a sealed diaphragm with one side in fluid communication with the working fluid and the other side in communication with a motor drive. Fluid is pumped as the motor drive flexes the diaphragm.

Each flow controller 22, 23, 24, 25 includes an adjustable orifice and an internal regulating valve that maintains a constant pressure drop across the orifice to achieve a constant volumetric flow rate. The volumetric flow rates through the flow controllers 22, 23, 24, 25 are independently adjustable such that the raw materials can be combined in desired proportions. For example, the volumetric flow rates through the flow controllers 22, 23, 24, 25 can be adjusted to achieve a target concentration of abrasive particles dispersed within the chemically corrosive agent.

Referring to FIGS. 2-3, the filter station 14 includes the first filter set 30, the second filter set 32, the valve switch 34, a stand 36, an enclosure 38, an inlet conduit 42, and an outlet conduit 44. The filter sets 30, 32 are supported by the stand 36 within the enclosure 38. The inlet conduit 42 and the outlet conduit 44 each pass through the enclosure 38 to allow the substantially continuous flow of slurry to pass through the filter station 14. The inlet conduit 42 and the outlet conduit 44 each include a respective quick disconnect coupling 43 that can facilitate connection and disconnection of the filter station 14 to the processing stream 29. Each filter set 30, 32 is in fluid communication with the valve switch 34 and the outlet conduit 44. The valve switch 34 is in fluid communication with the inlet conduit 42 such that, during use, the substantially continuous flow of slurry flowing through the inlet conduit 42 can be directed through either filter set 30, 32 for filtering.

The enclosure 38 is substantially cuboid and includes wheels 58. The cuboid shape can facilitate assembly, disassembly, and/or partial disassembly of the enclosure 38. Of course, the enclosure 38 can be other shapes other than cuboid. For example, the enclosure 38 can be cylindrical, pyramidal, conical, frusto-conical, and/or spherical.

The enclosure 38 has a size envelope of less than approximately 50"×40"×40". Filter station 14 can be moved on wheels 58 as necessary to construct plant 10 within an available footprint. The enclosure 38 can protect filter sets 30, 32 from damage as the filter station 14 is moved. Additionally or alternatively, the enclosure 38 can protect nearby operators and equipment during operation of the plant 10. The enclosure 38 is transparent plastic (e.g., poly(methyl methacrylate)) to facilitate visual inspection of filter station 14 during operation. The volume defined by the enclosure 38 is accessible from each side and from the top (e.g., through removable panels and/or doors) to facilitate access to components disposed within the enclosure 38 (e.g., filter sets 30, 32) during maintenance.

The filter sets 30, 32 are substantially identical. For the sake of clarity, components specific to filter set 30 are identified by reference numerals ending in "a," and components specific to filter set 32 are identified by reference numerals ending in "b."

Each filter set 30, 32 includes three elongate filter housings 46a,b, 47a,b, 48a,b, three pressure sensors 50a,b, 51a,b, 52a,b, and three cartridge filters 49. Each filter housing 46a,b, 47a,b, 48a,b has an inlet portion 54 and an outlet portion 56 and defines an elongate flow path therebetween. For clarity of illustration, the inlet portion 54 and the outlet portion 56 is shown only for the filter housing 46a. Filter housings 46b, 47a,b, 48a,b have analogous inlet and outlet portions which may be reversed with respect to the inlet portion 54 and the outlet portion 56 of the filter housing 46a. For example, the inlet portion of filter housing 47a may be arranged proximate to the outlet portion 56 of filter housing 46a.

A respective cartridge filter 49 is removably disposed along the elongate flow path defined by each filter housing 46a,b, 47a,b, 48a,b. Each pressure sensor 50a,b, 51a,b, 52a,b is in fluid communication with a respective elongate flow path defined by a respective filter housing 46a,b, 47a,b, 48a,b to measure the pressure drop of the substantially continuous flow of slurry passing through the cartridge filter 49 disposed in the filter housing. For example, the pressure drop across filter housing 46a can be measured as the difference between the pressures measured at pressure sensors 50a and 51a. Each measured pressure drop can indicate that the cartridge filter 49 disposed within the respective filter housing 46a,b, 47a,b, 48a,b is clogged and/or otherwise rendered ineffective for filtering the slurry.

The cartridge filters 49 are substantially cylindrical with a length of about 30 inches and an outer diameter of about 2.5 inches such that each cartridge filter 49 substantially fills the dimensions of the elongate flow path of each filter housing 46a,b, 47a,b, 48a,b. The cartridge filters 49 can be single open end, double open end, and/or O-ring typee filters. The pore size of the cartridge filters 49 can be greater than about 0.05 microns and/or less than about 200 microns (e.g., greater than about 0.1 microns and/or less than about 10 microns, greater than about 0.2 microns and/or less than about 1 micron).

Within each filter set 30, 32, the respective filter housings 46a,b, 47a,b, 48a,b are in fluid communication in series. For example, when the valve switch 34 directs slurry through a given filter set 30, the slurry enters filter housing 46a, runs through filter housings 46a, 47a, 48a in succession, and then exits filter housing 48a into the outlet conduit 44. In this successive arrangement, the cartridge filters 49 disposed in respective filter housings 46a,b, 47a,b, 48a,b have progressively smaller pore sizes such that the pore size of the cartridge filter 49 disposed in filter housing 47a,b is less than the pore size of the cartridge filter 49 disposed in the respective filter housing 46a,b and greater than the pore size of the cartridge filter 49 disposed in the respective filter housing 48a,b. This arrangement of successively less porous cartridge filters 49 can allow the more porous cartridge filters 49 to remove particles that could otherwise damage and/or significantly clog the less porous downstream filter(s). Thus, this successive arrangement of cartridge filters 49 can increase the amount of time between filter changes, resulting in both time and cost savings.

In each filter set 30, 32, the respective filter housing 46a,b is in fluid communication with the valve switch 34 through flexible tubing extending from an outlet of the valve switch 34 to a quick disconnect coupling such that filter housing 46a,b can be disconnected from the valve switch 34. Similarly, in each filter set 30, 32, the respective filter housing 48a,b is in fluid communication with the outlet conduit 44 through flexible tubing extending from a quick disconnect coupling at the outlet portion 56 of filter housing 48a,b to the outlet conduit 44. Within each filter set 30, 32, the filter housings 46a,b, 47a,b, 48a,b are connected in series using flexible tubing terminating at quick disconnect couplings at either end portion of the respective filter housing. The use of quick disconnect couplings to connect filter housings 46a,b, 47a,b, 48a,b in fluid communication with other parts of the plant 10 reduces maintenance time by improving access to cartridge filters in the filter housings 46a,b, 47a,b, 48a,b. Additionally or alternatively, the flexibility of the tubing used to achieve fluid communication in the filter station 14 can facilitate moving the filter sets 30, 32, for example, during initial configuration of the plant 10 or during maintenance.

The stand 36 supports the filter sets 30, 32 such that the respective elongate flow paths defined by the filter housings 46a,b, 47a,b, 48a,b are substantially vertical during operation of the plant 10. Because off-the-shelf cartridge filters 49 are typically elongate, this substantially vertical orientation of the elongate flow paths of filter housings 46a,b, 47a,b, 48a,b can facilitate fitting the filter station 14 within a size envelope that is amenable to portability. For example, this substantially vertical orientation can facilitate fitting the filter station 14 within the envelope with dimensions of 50"×40"×40".

Referring to FIG. 3, a portion (e.g., an inlet portion 54 and/or an outlet portion 56) of each filter housing 46a, 47a, 48a of filter set 30 is hinged to the stand 36 such that an unhinged portion of each filter housing 46a, 47a, 48a can be tilted (e.g., to about a 45 degree angle) about a horizontal axis. During use, the unhinged portion of each filter housing 46a, 47a, 48a can be disconnected, and each filter housing 46a, 47a, 48a can be independently tilted away from the stand 36 to improve, for example, accessibility of the cartridge filters 49 disposed in the filter housings 46a, 47a, 48a. For example, the independent tilting of each filter housing 46a, 47a, 48a can facilitate replacement of a single cartridge filter 49 at a time. Thus, if two cartridge filters 49 of one of the filter sets 30, 32 are clogged, an operator can remove the clogged cartridge filters while leaving the third cartridge filter in place. As compared to systems that require replacement of all filters at once, the ability to replace cartridge filters 49 selectively can reduce the overall operating cost of the plant 10. Additionally or alternatively, tilting the filter housings 46a, 47a, 48a away from the stand 36 can reduce the overall amount of space required to perform maintenance on the filter station 14 (e.g., by reducing the vertical head space required to pull or install the cartridge filters 49).

For the sake of clarity and ease of illustration, only the support of filter set 30 on stand 36 has been described. It should be noted, however, that filter set 32 is supported on stand 36 in an analogous manner.

Figure 4:
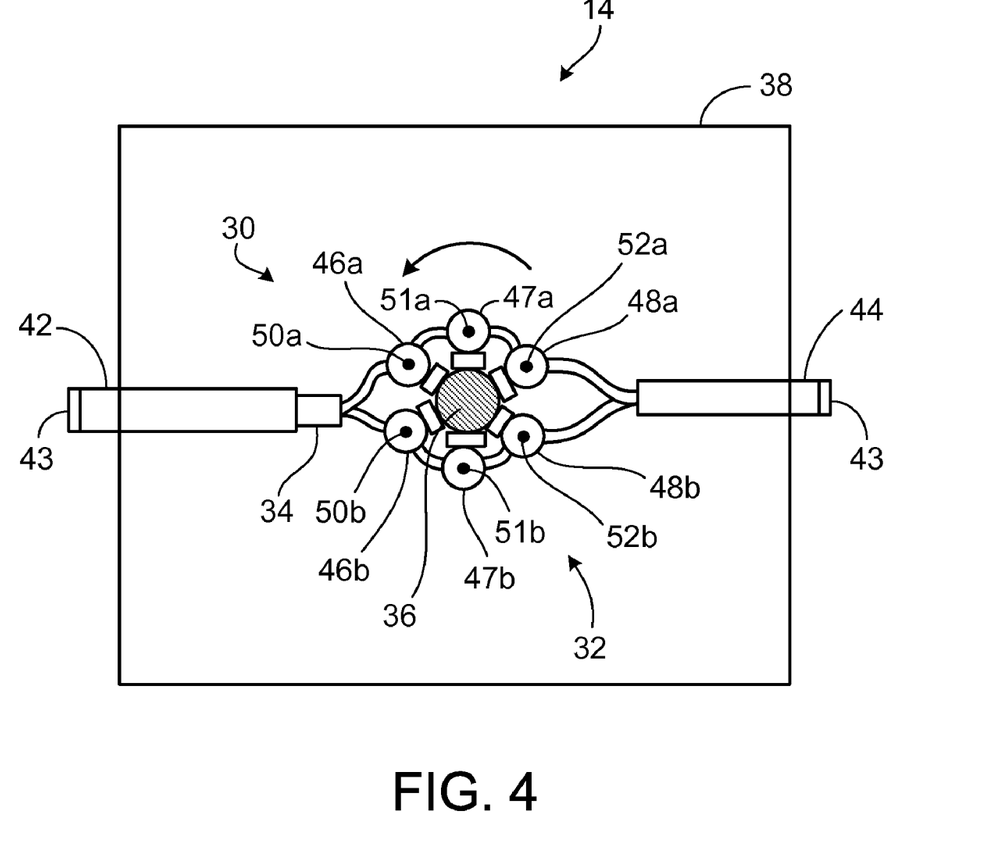
FIG. 4 is a schematic of a stand of the filter station of FIG. 1 rotating about a vertical axis during repositioning of the filter station.

Referring to FIG. 4, the stand 36 is rotatable about a vertical axis to facilitate positioning filter sets 30, 32 for ease of accessibility. For example, stand 36 can be rotated about a vertical axis during configuration or reconfiguration of the plant 10 such that filter station 14 can be moved to a corner while still allowing filter sets 30, 32 to be positioned for access during maintenance. Stand 36 can lock into place during operation of the plant 10 to reduce the likelihood that filter sets 30, 32 will move out of position.

Figure 5:
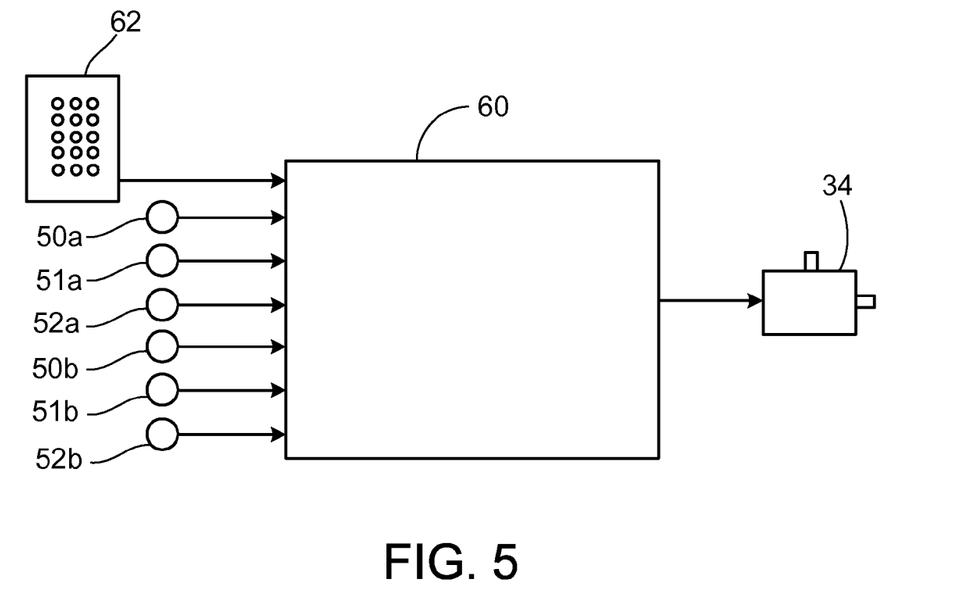
FIG. 5 is a schematic of inputs to and outputs from a controller of the plant of FIG. 1.

Referring to FIG. 5, a controller 60 is in communication (e.g., electrical communication) with the pressure sensors 50a,b, 51a,b, 52a,b, the valve switch 34, and an input device 62. During use, the controller 60 receives input signals from the pressure sensors 50a,b, 51a,b, 52a,b and the input device 62 (e.g., keyboard). The controller 60 sends output signals to the valve switch 34. The controller 60 controls the position of the valve switch 34 based at least in part on the signals from the pressure sensors 50a,b, 51a,b, 52a,b. Additionally or alternatively, the controller 60 can control the position of the valve switch 34 based on the signal from the input device 62. The controller 60 receives pressure measurements from pressure sensors 50a,b, 51a,b, 52a,b. Based on these pressure measurements, the controller 60 can send a command signal to the valve switch 34 to divert the continuous flow of slurry to another filter set as necessary to allow continuous operation of the plant 10.

Figure 6:
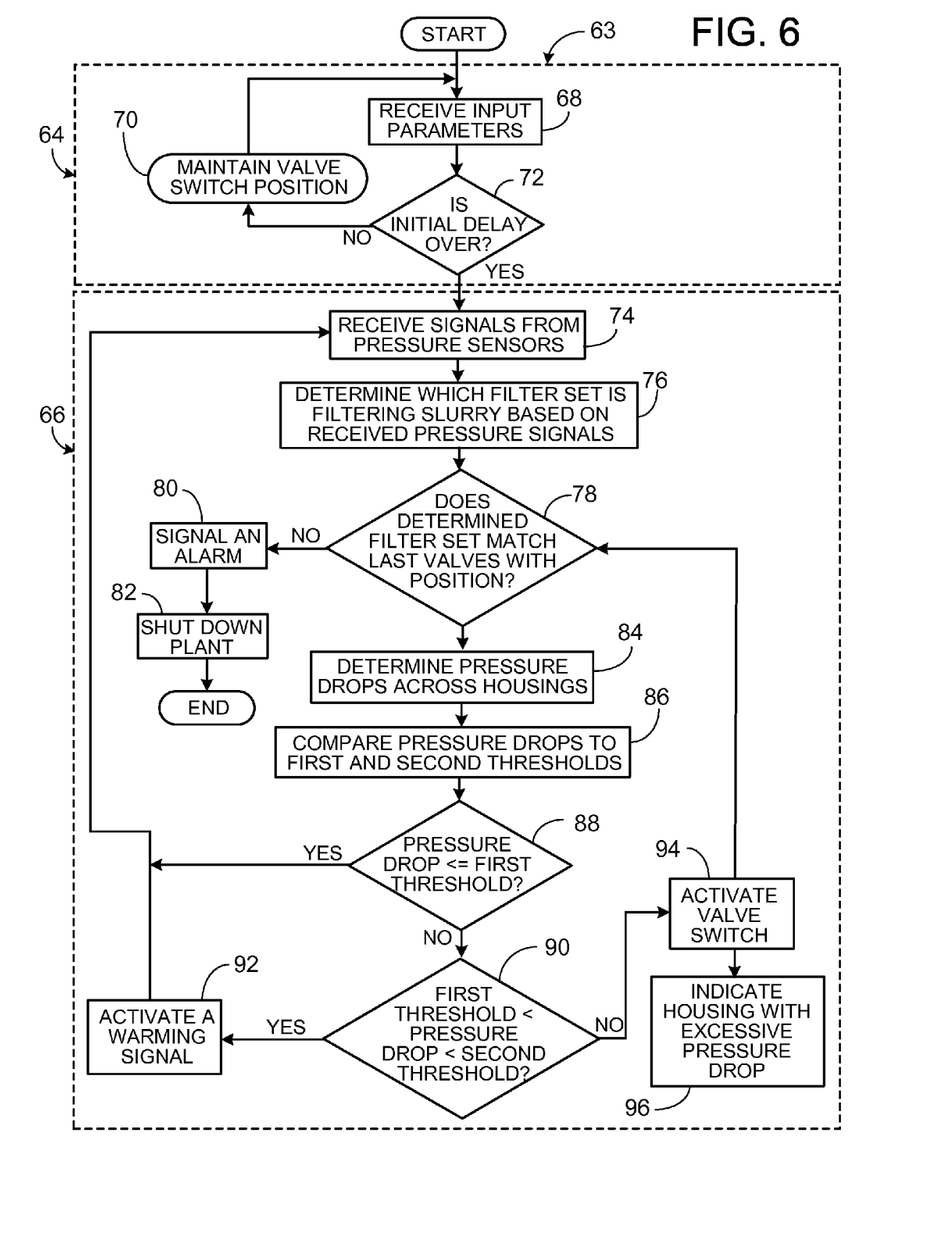
FIG. 6 is a flow chart of a process used to control the position of a valve switch of the filter station of FIG. 1 based on pressure measurements received from pressure sensors in communication with a continuous flow of slurry through the filter station.

FIG. 6 shows an example of a controller process 63 used to control the position of the valve switch 34. The controller process includes a setup stage 64 and a monitoring stage 66.

In the setup stage 64, the controller 60 receives 68 input parameters related to slurry processing (e.g., through input device 62). The input parameters include a first threshold pressure drop at which a warning signal will be generated and a second threshold pressure drop, greater than the first, at which the valve switch 34 will be activated to redirect slurry flow between filter sets 30, 32. The input parameters also include an initial time delay, during which the valve switch 34 is maintained 70 in a fixed position to allow the plant 10 to reach steady state operation.

Once the controller 60 determines 72 that the initial time delay has lapsed, the controller 60 enters the monitoring stage 66 in which the controller receives 74 pressure measurements from each sensor 50a,b, 51a,b, 52a,b associated with filter sets 30, 32. The controller 60 determines 76 which filter set 30, 32 is filtering slurry based on the magnitude of the pressure measurements of the pressure sensors 50a,b, 51a,b, 52a,b associated with each filter set 30, 32. For example, the filter set 30, 32 associated with pressure measurements approximately equal to atmospheric pressure is the filter set that is not in use. The controller 60 checks 78 this determination with the last actual valve switch 34 position sent by the controller 60. If the determined and actual valve switch 34 positions do not match, the controller 60 signals 80 an alarm and shuts down 82 the plant 10.

For the filter set 30, 32 that is filtering slurry, the controller 60 determines 84 the pressure drop across each filter housing 46a,b, 47a,b, 48a,b (e.g., across each cartridge filter 49) based on the measurements received from pressure sensors 50a,b, 51a,b, 52a,b. The controller 60 compares 86 the pressure drop across each filter housing 46a,b, 47a,b, 48a,b to the first and second threshold pressure drops entered during the setup stage 64. For example, the pressure drop across filter housing 46a can be determined by subtracting the pressure reading from pressure sensor 51a from the upstream pressure reading from pressure sensor 50a, and this pressure drop is compared to the first and second threshold pressure drops. If the pressure drop across all three cartridge filters 49 in a filter set 30, 32 is less than or equal to the first threshold pressure drop 88, the controller 60 continues to monitor the pressure drop across the filter housings 46a,b, 47a,b, 48a,b. If the pressure drop across one of the filter housings 46a,b, 47a,b, 48a,b is between the first and the second threshold pressure drops 90, the controller 60 activates 92 a warning signal (e.g., a visual alert) indicating which filter housing 46a,b, 47a,b, 48a,b is associated with the warning signal. If the pressure drop across one of the filter housings 46a,b, 47a,b, 48a,b is greater than the second threshold pressure drop, the controller 60 activates 94 the valve switch 34 to direct the slurry flow to the other filter set 30, 32. The controller 60 also indicates 96 which filter housing(s) 46a,b, 47a,b, 48a,b had the excessive pressure drop that caused the activation of the valve switch 34.

In response to the indication 96 by the controller 60, an operator can open one or more sides of the enclosure 38 to disconnect the flexible filter tubing connected to the appropriate filter housing(s) 46a,b, 47a,b, 48a,b. The operator can tilt the filter housing(s) 46a,b, 47a,b, 48a,b away from the stand 36 to replace the filter in the filter housing(s) 46a,b, 47a,b, 48a,b. While the operator is replacing these filters, a substantially continuous flow of slurry continues to flow through the filter set that is not being serviced.

Control process 63 can be implemented in digital electronic circuitry, or in computer hardware, firmware, software, or in combinations thereof. Controller 60 can be implemented in a computer program product tangibly embodied or stored in a machine-readable storage device for execution by a programmable processor; and control process 63 can be performed by a programmable processor executing a program of instructions to perform functions of the invention by operating on input data and generating output. The control process 63 can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

While certain embodiments have been described, other embodiments are possible.

For example, while the controller 60 has been described as determining pressure drop across each filter housing 46a,b, 47a,b, 48a,b, other embodiments are possible. For example, a controller can activate the valve switch 34 based on the pressure drop across the overall filter set 30, 32.

As another example, while each filter set 30, 32 has been described as including filter housings 46a,b, 47a,b, 48a,b arranged in series, other embodiments are possible. The flexible tubing connected to the filter housings 46a,b, 47a,b, 48a,b can be reconnected and/or replaced such that slurry flows through filter housings 46a,b, 47a,b, 48a,b in parallel.

As yet another example, while the filter station 14 has been described as including two filter sets 30, 32, other embodiments are possible. For example a filter station can include three or more filter sets and a valve switch having a respective number of positions (e.g., three positions if there are three filter sets). These additional filter sets can increase the amount of time that the plant 10 can be operated without maintenance, which can reduce the operating cost of a continuous slurry blending plant.

As still another example, while each filter set 30, 32 has been described as including three filter housings 46a,b, 47a,b, 48a,b, other embodiments are possible. For example, each filter set can include two filter housings. As another example, each filter set can include four or more filter housings. Additionally or alternatively, the first filter set can include a different number (e.g., a greater number) of filter housings than the second filter set.

As another example, while filter housings 46a,b, 47a,b, 48a,b have been described as being connected in fluid communication with other components of the filter station 14, other embodiments are possible. For example, substantially rigid pipes can connect filter housings to the other components of a filter station. These substantially rigid pipes can reduce the likelihood that leaks will develop over long periods of substantially continuous operation.

As yet another example, while the filter station 14 has been described as having an enclosure including wheels 58 and fitting within a 50"×40"×40" envelope, other embodiments are possible. For example, in some embodiments, a filter station 14 can include filter housings 46a,b, 47a,b, 48a,b dimensioned to support cartridge filters 49 having an outer diameter of greater than about 2.5 inches and/or less than about 18 inches. In some embodiments, a filter station 14 can include filter housings dimensioned to support cartridge filters 49 having a length of greater than about 1 inch and/or less than about 50 inches (e.g., about 10 inches, about 20 inches). In certain embodiments, a filter station can be dimensioned for bench top filtration including cartridge filters 49 having a length of about 10 inches. Additionally or alternatively, a bench top filter station can include an enclosure that sits substantially flat (e.g., without wheels) on the bench top to reduce the likelihood that the bench top unit can be inadvertently moved. In some embodiments, a bench top filter station can include an enclosure having one or more handles to facilitate positioning the bench top filter station.

As another example, while the filter station 14 has been shown as having pressure sensors 50a,b, 51a,b, 52a,b extending substantially parallel to the elongate flow path defined by the respective filter housings 46a,b, 47a,b, 48a,b, other embodiments are possible. For example, pressure sensors 50a,b, 51a,b, 52a,b can be mounted at an angle (e.g., about a 45 degree angle) to the elongate flow path such that each pressure sensor extends away from the stand 36. Such angled pressure sensors can facilitate tilting filter housings 46a,b, 47a,b, 48a,b without interference from other components (e.g., other filter housings or the stand).

As still another example, while the filter station 14 has been described as having pressure sensors 50a,b, 51a,b, 52a,b in communication with filter housings 46a,b, 47a,b, 48a,b, other embodiments are possible. For example, a filter station can include one or more of the following measurements downstream of each cartridge filter to indicate whether the respective filter is clogged: pH; large particle counting (LPC), and conductivity.

As yet another example, while pumps 18, 19, 20, 21 have been described as electro-mechanical diaphragm pumps, other embodiments are possible. For example, pumps 18, 19, 20, 21 can be bladder pumps. Each bladder pump includes a bladder disposed in a filter housing. During use, raw material is drawn into the bladder as it expands under vacuum pressure exerted outside of the bladder, between the bladder and the filter housing. With raw material in the bladder, pressurized fluid (e.g., air) is introduced outside of the bladder, between the bladder and the filter housing. The pressurized fluid collapses the bladder to force the raw material out of the bladder and into the processing stream. Without mechanical actuation, such bladder pumps are reliable over the long periods of substantially continuous operation that are possible with the filter station 14. The bladder pump can be, for example, a NOWPAK® container assembly available from ATMI, Inc. of Danbury, Conn.

As still another example, while the mixing station 12 has been described as including flow controller 22, 23, 24, 25, each including an adjustable orifice and an internal regulating valve, other embodiments are possible. For example, a mixing station can include a U-tube flow controller including a reservoir and an adjustable U-tube. The adjustable U-tube is positionable to set the maximum level of fluid in the reservoir. During use, fluid will continue to collect in the reservoir until the fluid level reaches the apex of the U-tube. Once the fluid in the reservoir reaches this level, additional fluid added to the reservoir will flow out of the reservoir through the U-tube (e.g., into an overflow volume to be recycled back into the system). Without mechanical actuation, U-tube flow controllers are reliable over the long periods of substantially continuous operation that are possible with the filter station 14. An example of a U-tube flow controller is the U-Tube technology available from ChemFlow Systems, Inc. of San Jose, Calif.

While filter station 14 has been described as processing a CMP slurry used in semiconductor fabrication, a filter station can be used to filter any of various different types of fluids used in any of various different industries. For example, a filter station can include stainless steel filter housings and be used to filter milk during dairy processing.

What is claimed is:

1. A fluid filtration apparatus comprising:
   a first and a second plurality of filter housings, each of the first plurality of filter housings in fluid communication with one another, each of the second plurality of filter housings in fluid communication with one another, each filter housing comprising an inlet portion and an outlet portion, each filter housing defining an elongate flow path from the inlet portion to the outlet portion, each filter housing configured to support therein a respective filter along the elongate flow path to filter a substantially continuous flow of fluid moving from the inlet portion to the outlet portion; and
   a valve switch in fluid communication with each of the first plurality of filter housings and the second plurality of filter housings, the valve switch movable to redirect a substantially continuous flow of fluid from flowing through the first plurality of filter housings to flowing through the second plurality of filter housings, at least a portion of each of the first plurality of filter housings detachable from the one another as the substantially continuous flow of fluid flows through the second plurality of filter housings.

2. The fluid filtration apparatus of claim 1, wherein the filter housings of at least one of the first plurality of filter housings and the second plurality of filter housings are in fluid communication in series with one another to receive a substantially continuous flow of fluid.

3. The fluid filtration apparatus of claim 1, wherein the filter housings of at least one of the first plurality of filter housings and the second plurality of filter housings is arranged in parallel with one another such that each filter housing receives at least a portion of a substantially continuous flow of fluid.

4. The fluid filtration apparatus of claim 1, further comprising a movable enclosure comprising a plurality of wheels for moving the fluid filtration apparatus, the first and second plurality of filter housings disposed substantially within the movable enclosure, above the plurality of wheels.

5. The fluid filtration apparatus of claim 1, further comprising a movable enclosure disposed about the first and second plurality of filter housings, an inlet conduit passing through the movable enclosure for fluid communication with the first and second plurality of filter housings, and an outlet conduit passing through the movable enclosure for fluid communication with the first and second plurality of filter housings.

6. The fluid filtration apparatus of claim 1, further comprising a plurality of sensors, each sensor in fluid communication with at least one filter housing.

7. The fluid filtration apparatus of claim 6, wherein each sensor extends away from at least one filter housing at an angle with respect to the respective elongate flow path.

8. The fluid filtration apparatus of claim 1, further comprising a stand supporting the first and second plurality of filter housings, wherein the stand is rotatable about a vertical axis to move the first and second plurality of filter housings relative to the movable enclosure.

9. The fluid filtration apparatus of claim 1, further comprising a first plurality of sensors, each of the first plurality of sensors configured to measure a fluid parameter and in fluid communication with a volume defined by a respective filter housing of the first plurality of filter housings, and a second plurality of sensors, each of the second plurality of sensors configured to measure a fluid parameter and in fluid communication with a volume defined by a respective filter housing of the second plurality of housings.

10. The fluid filtration apparatus of claim 9, further comprising a controller in electrical communication with the first and second plurality of sensors, the controller configured to
    receive a measured fluid parameter from the sensors, and
    move the valve switch based on a comparison between the measured fluid parameter and a threshold value.

11. The fluid filtration apparatus of claim 10, wherein the controller is further configured to send an alarm signal to indicate the need for maintenance of the first plurality of filter housings.

12. The fluid filtration apparatus of claim 11, wherein the controller is further configured to indicate which filter housing of the first plurality of filter housings requires maintenance.

13. The fluid filtration apparatus of claim 10, wherein the controller is further configured to compare the valve switch position to signals received from the plurality of sensors to determine an alarm condition.

14. The fluid filtration apparatus of claim 10, wherein each sensor is configured to measure pressure of fluid in the respective filter housing of the respective first and second plurality of filter housings.

15. The fluid filtration apparatus of claim 14, wherein the controller is configured to determine the pressure drop across a filter supported in a respective filter housing.

16. A fluid filtration system comprising:
    a material feed;
    a flow controller in fluid communication with the material feed and a processing stream;
    a pump in fluid communication with the material feed and the flow controller, the pump configured to move material from the material feed to the flow controller; and
    a fluid filtration apparatus in fluid communication with the pump, the fluid filtration apparatus comprising,
        a first plurality of filter housings, each filter housing of the first plurality of filter housings is in fluid communication with one another,
        a second plurality of filter housings, each filter housing of the first plurality of filter housings is in fluid communication with one another, and
        a valve switch in fluid communication with each of the first plurality of filter housings and the second plurality of filter housings, the valve switch movable to redirect a substantially continuous flow of fluid from flowing through the first plurality of filter housings to flowing through the second plurality of filter housings, at least a portion of each of the first plurality of filter housings detachable from the one another as the substantially continuous flow of fluid flows through the second plurality of filter housings, wherein each filter housing comprises an inlet portion and an outlet portion, each filter housing defines an elongate flow path from the inlet portion to the outlet portion, and each filter housing is configured to support therein a respective filter along the elongate flow path to filter a substantially continuous flow of fluid moving from the inlet portion to the outlet portion.

17. The fluid filtration system of claim 16, wherein the first plurality of filter housings support filters having progressively smaller pore sizes in the direction of the substantially continuous flow of fluid.

18. The fluid filtration apparatus of claim 1, wherein each filter housing is supported such that the elongate flow path of each filter housing is substantially parallel to a vertical axis.

19. The fluid filtration apparatus of claim 16, wherein each filter housing comprises a top portion and a bottom portion, each filter housing supported near the top portion, each filter housing unsupported near the bottom portion.

20. The fluid filtration apparatus of claim 6, wherein each of the plurality of sensors is configured to measure large particle count of fluid moving through the respective first and second plurality of filter housings.

* * * * *

UNITED STATES PATENT AND TRADEMARK OFFICE
CERTIFICATE OF CORRECTION

| | | |
|---|---|---|
| PATENT NO. | : 8,303,806 B2 | Page 1 of 1 |
| APPLICATION NO. | : 12/702602 | |
| DATED | : November 6, 2012 | |
| INVENTOR(S) | : Saeed H. Mohseni and Deepak Mahulikar | |

It is certified that error appears in the above-identified patent and that said Letters Patent is hereby corrected as shown below:

Column 5, Line 13
Delete "product packaging station 16" and insert --product packaging station 31-- therefor.

Column 5, Line 15
Delete "product packaging station 16" and insert --product packaging station 31-- therefor.

Column 5, Line 27
Delete "product packaging station 16" and insert --product packaging station 31-- therefor.

Column 5, Line 40
Delete "product packaging station 16" and insert --product packaging station 31-- therefor.

Column 14, Line 38
In Claim 19, delete "apparatus" and insert --system-- therefor.

Signed and Sealed this
Fifteenth Day of January, 2013

David J. Kappos
*Director of the United States Patent and Trademark Office*